United States Patent
Chen et al.

(10) Patent No.: US 9,432,730 B2
(45) Date of Patent: Aug. 30, 2016

(54) MULTIMEDIA FILE PLAYBACK METHOD AND APPARATUS

(71) Applicant: Huawei Technologies Co., Ltd., Shenzhen (CN)

(72) Inventors: Meixing Chen, Shenzhen (CN); Hongkai Zhou, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/107,944

(22) Filed: Dec. 16, 2013

(65) Prior Publication Data

US 2014/0178048 A1    Jun. 26, 2014

Related U.S. Application Data

(63) Continuation of application No. PCT/CN2013/080678, filed on Aug. 2, 2013.

(30) Foreign Application Priority Data

Dec. 26, 2012 (CN) .......................... 2012 1 0574660

(51) Int. Cl.
*H04N 5/77* (2006.01)
*H04N 5/76* (2006.01)
(Continued)

(52) U.S. Cl.
CPC ...... *H04N 21/4415* (2013.01); *G06K 9/00288* (2013.01); *G11B 27/102* (2013.01); *G11B 27/322* (2013.01); *H04N 21/4223* (2013.01); *H04N 21/4542* (2013.01);
(Continued)

(58) Field of Classification Search
USPC .......................................... 386/223–224, 291
See application file for complete search history.

(56) References Cited

U.S. PATENT DOCUMENTS 8,391,672 B2 * 3/2013 Ikeda ..................... G11B 20/10
386/239
2004/0006767 A1 1/2004 Robson et al.
(Continued)

FOREIGN PATENT DOCUMENTS

CN  1981281 A    6/2007
CN  101529446 A   9/2009
(Continued)

OTHER PUBLICATIONS

Foreign Communication From a Counterpart Application, PCT Application No. PCT/CN2013/080678, International Search Report dated Oct. 31, 2013, 7 pages.
(Continued)

*Primary Examiner* — Nigar Chowdhury
(74) *Attorney, Agent, or Firm* — Conley Rose, P.C.; Grant Rodolph; Nicholas K. Beaulieu

(57) ABSTRACT

A multimedia file playback method and apparatus where the multimedia file playback method includes: recognizing a face of a viewer to determine an age type of the viewer, where the age type includes an adult type and a juvenile type; obtaining information about a position and length of a sensitive clip in the multimedia file if the determined age type includes a juvenile type; and playing the multimedia file in which the sensitive clip is hidden to the viewer according to the information about the position and length of the sensitive clip in the multimedia file. The multimedia file playback method and apparatus can prevent inappropriate videos, images, and other information from adversely affecting juveniles.

16 Claims, 4 Drawing Sheets

(51) Int. Cl.
*H04N 21/4415* (2011.01)
*G06K 9/00* (2006.01)
*H04N 21/4223* (2011.01)
*H04N 21/454* (2011.01)
*H04N 21/845* (2011.01)
*G11B 27/10* (2006.01)
*G11B 27/32* (2006.01)
*H04H 60/45* (2008.01)

(52) U.S. Cl.
CPC .......... *H04N 21/8456* (2013.01); *H04H 60/45* (2013.01); *H04H 2201/80* (2013.01)

(56) References Cited

U.S. PATENT DOCUMENTS

| | | | | |
|---|---|---|---|---|
| 2004/0163123 | A1* | 8/2004 | Okada | H04N 7/173 725/116 |
| 2004/0237032 | A1* | 11/2004 | Miele | G06F 17/241 715/201 |
| 2005/0084246 | A1* | 4/2005 | Yamagaka | G11B 27/105 386/241 |
| 2009/0133051 | A1* | 5/2009 | Hildreth | 725/28 |
| 2010/0007726 | A1 | 1/2010 | Barbieri et al. | |
| 2010/0289875 | A1* | 11/2010 | Newton | H04N 19/597 348/43 |
| 2014/0104440 | A1* | 4/2014 | Sampathkumaran et al. | 348/207.1 |

FOREIGN PATENT DOCUMENTS

| | | |
|---|---|---|
| CN | 101998161 A | 3/2011 |
| CN | 102214286 A | 10/2011 |
| WO | 2005099413 A2 | 11/2005 |

OTHER PUBLICATIONS

Foreign Communication From a Counterpart Application, PCT Application No. PCT/CN2013/080678, Written Opinion dated Oct. 31, 2013, 4 pages.
Partial English Translation and Abstract of Chinese Patent Application No. CN101998161A, Feb. 12, 2014, 3 pages.
Partial English Translation and Abstract of Chinese Patent Application No. CN102214286A, Feb. 12, 2014, 3 pages.

* cited by examiner

# MULTIMEDIA FILE PLAYBACK METHOD AND APPARATUS

CROSS-REFERENCE TO RELATED APPLICATIONS

This application is a continuation of International Application No. PCT/CN2013/080678, filed on Aug. 2, 2013, which claims priority to Chinese Patent Application No. 201210574660.1, filed on Dec. 26, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the field of multimedia technologies, and in particular, to a multimedia file playback method and apparatus based on face recognition.

BACKGROUND OF THE INVENTION

Currently, multimedia files played by a multimedia playback device or a network playback device sometimes include sensitive clips such as content that is unhealthy or inappropriate for specific viewers, for example, pornography, blood and gore, and violence. To protect rights and interests of the viewers, the multimedia playback device or the network playback device perform processing or display a prompt message beforehand for a multimedia file to be played. A common practice is for the multimedia playback device to insert text warning information before playing a sensitive clip, but the warning information appears for only a period, and the sensitive clip cannot be filtered out.

In addition, a variety of content filtering technologies and products have been provided in the prior art. The content filtering technologies include a name list filtering technology, a keyword filtering technology, an image filtering technology, a template filtering technology, and a smart filtering technology, which are mainly classified into two types: gateway-based filtering technologies and proxy-based filtering technologies. A user of a content filtering product (such as child lock V-Chip) can use an administrator account and a password to log in and set keywords of content that needs to be masked, and the related content will be filtered out. However, the content filtering technologies and products disregard the type of viewers, and filtered content impairs the rights and interests of some viewers while protecting the rights and interests of other viewers. Therefore, it is urgent to develop a content filtering technology that can take into account the rights and interests of different viewers, and especially can prevent inappropriate videos, images, and other information from adversely affecting juveniles.

SUMMARY

The present disclosure discloses a multimedia file playback method and apparatus to prevent inappropriate videos, images, and other information from adversely affecting juveniles.

According to a first aspect, a multimedia file playback method is disclosed, including: recognizing a face of a viewer to determine an age type of the viewer, where the age type includes an adult type and a juvenile type; obtaining information about a position and length of a sensitive clip in the multimedia file if the determined age type includes a juvenile type; and playing the multimedia file in which the sensitive clip is hidden to the viewer according to the information about the position and length of the sensitive clip in the multimedia file.

With reference to the first aspect, in a first implementation manner of the first aspect, the obtaining information about a position and length of a sensitive clip in the multimedia file if the determined age type includes a juvenile type includes: obtaining the information about the position and length of the sensitive clip in the multimedia file if the determined age type is a juvenile type or is a juvenile type and an adult type.

With reference to the first implementation manner of the first aspect, in a second implementation manner of the first aspect, before the playing the multimedia file to the viewer according to the type of the viewer, the method further includes: obtaining the information about the position and length of the sensitive clip in the multimedia file from an additional information file corresponding to the multimedia file, where the additional information file is used to store the information about the position and length of the sensitive clip in the multimedia file.

With reference to the first aspect and the first implementation manner and the second implementation manner of the first aspect, in a third implementation manner of the first aspect, the obtaining information about a position and length of a sensitive clip in the multimedia file includes: determining the position and length of the sensitive clip in the multimedia file by detecting content of the multimedia file.

With reference to the first aspect and the first implementation manner and the second implementation manner of the first aspect, in a fourth implementation manner of the first aspect, the obtaining information about a position and length of a sensitive clip in the multimedia file includes: obtaining the information about the position and length of the sensitive clip in the multimedia file from an additional information file corresponding to the multimedia file, where the additional information file is used to store the information about the position and length of the sensitive clip in the multimedia file.

With reference to the first aspect and each implementation manner of the first aspect, in a fifth implementation manner of the first aspect, after the recognizing a face of a viewer to determine an age type of the viewer, the method further includes: playing the multimedia file in which the sensitive clip is not hidden to the viewer if the age type of the viewer is an adult type; or, if the age type of the viewer includes an adult type and a juvenile type, displaying option information asking whether to play the sensitive clip, and playing the multimedia file in which the sensitive clip is not hidden to the viewer if a selection made by the viewer in response to the option information indicates playing the sensitive clip.

With reference to the first aspect and each implementation manner of the first aspect, in a sixth implementation manner of the first aspect, the recognizing a face of a viewer to determine an age type of the viewer includes: recognizing the face of the viewer according to facial features or facial movement expressions to determine the age type of the viewer.

With reference to the sixth implementation manner of the first aspect, in a seventh implementation manner of the first aspect, before the recognizing the face of the viewer according to facial features or facial movement expressions, the method further includes: creating a viewer face information database, where the face information database stores face information of two types of viewers, that is, an adult type and a juvenile type; and using a machine recognition algorithm to extract the facial features according to the face information database.

According to a second aspect, a multimedia file playback apparatus is disclosed, including: a recognizing unit configured to recognize a face of a viewer to determine an age type of the viewer, where the age type includes an adult type and a juvenile type; an obtaining unit configured to obtain information about a position and length of a sensitive clip in the multimedia file if the age type determined by the recognizing unit includes a juvenile type; and a playback unit configured to play the multimedia file in which the sensitive clip is hidden to the viewer according to the information about the position and length of the sensitive clip in the multimedia file, where the information is obtained by the obtaining unit.

With reference to the second aspect, in a first implementation manner of the second aspect, the obtaining unit is configured to obtain the information about the position and length of the sensitive clip in the multimedia file if the age type determined by the recognizing unit is a juvenile type or is a juvenile type and an adult type.

With reference to the first implementation manner of the second aspect, in a second implementation manner of the second aspect, the playback unit is configured to: if the age type of the viewer recognized by the recognizing unit includes an adult type and a juvenile type, display option information asking whether to play the sensitive clip, and receive a response to the option information, where the response indicates not playing the sensitive clip; the obtaining unit is specifically configured to: obtain information about the position and length of the sensitive clip in the multimedia file after the playback unit receives the response to the option information, where the response indicates not playing the sensitive clip; and the playback unit is further configured to play the multimedia file in which the sensitive clip is hidden to the viewer according to the information about the position and length of the sensitive clip after receiving the response to the option information, where the information about the position and length is obtained by the obtaining unit and the response indicates not playing the sensitive clip.

With reference to the first implementation manner of the second aspect, in a third implementation manner of the second aspect, the obtaining unit is specifically configured to determine the position and length of the sensitive clip in the multimedia file by detecting content of the multimedia file if the age type determined by the recognizing unit is a juvenile type or is a juvenile type and an adult type.

With reference to the first implementation manner of the second aspect, in a fourth implementation manner of the second aspect, the obtaining unit is specifically configured to: if the age type determined by the recognizing unit is a juvenile type or is a juvenile type and an adult type, obtain the information about the position and length of the sensitive clip in the multimedia file from an additional information file corresponding to the multimedia file, where the additional information file is used to store the information about the position and length of the sensitive clip in the multimedia file.

With reference to the second aspect and each implementation manner of the second aspect, in a fifth implementation manner of the second aspect, the playback unit is further configured to play the multimedia file in which the sensitive clip is not hidden to the viewer if the age type of the viewer recognized by the recognizing unit is an adult type.

With reference to the second aspect and each implementation manner of the second aspect, in a sixth implementation manner of the second aspect, the recognizing unit is specifically configured to recognize the face of the viewer according to facial features or facial movement expressions to determine the age type of the viewer.

With reference to the sixth implementation manner of the second aspect, in a seventh implementation manner of the second aspect, the apparatus further includes: a database creating unit, configured to: before the recognizing unit recognizes the face of the viewer according to facial features or facial movement expressions, create a viewer face information database, where the face information database stores face information of two types of viewers, that is, an adult type and a juvenile type; and a facial feature extracting unit, configured to use a machine recognition algorithm to extract the facial features according to the face information database created by the database creating unit.

In the embodiments of the present disclosure, a multimedia file in which a sensitive clip is hidden is played only to a juvenile viewer, so that inappropriate videos, images, and other information can be prevented from adversely affecting juveniles. Further, by using the embodiments of the present disclosure, a multimedia file can be selected to be played while rights and interests of different viewers are taken into account.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
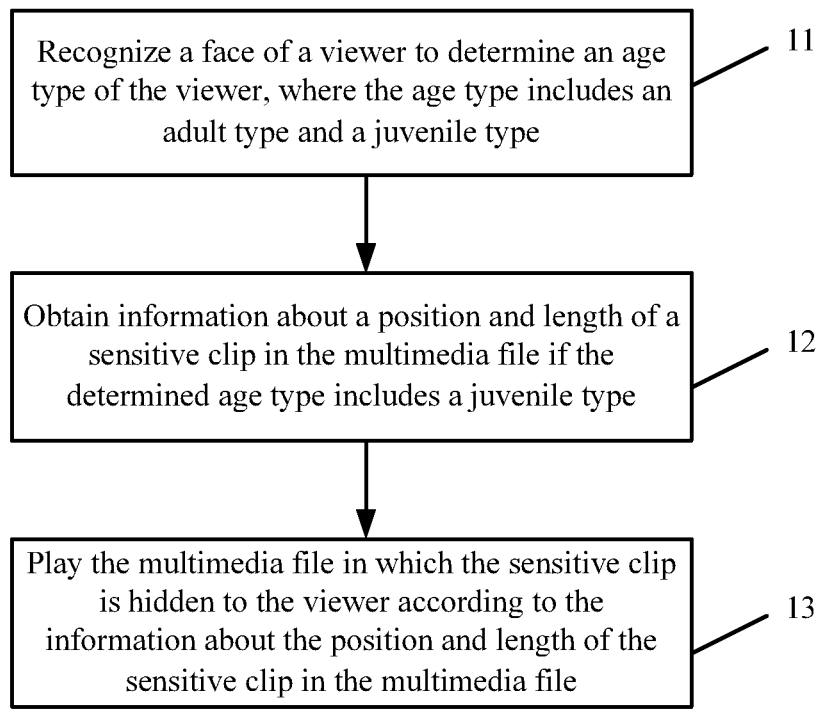
FIG. 1 is a flowchart of a multimedia file playback method according to an embodiment of the present disclosure.

An embodiment of the application provides a multimedia file playback method. As shown in FIG. 1, the method includes the following steps. Here the multimedia file is a video file, an audio file, a PowerPoint file, or the like.

At step 11: A playback device recognizes a face of a viewer to determine an age type of the viewer, where the age type includes an adult type and a juvenile type.

Generally, a face recognition system in the playback device recognizes the face of the viewer, so as to classify the viewer into different age types, for example, an adult or juvenile, that is, a viewer allowed to watch a sensitive clip in a multimedia file or a viewer forbidden to watch the sensitive clip, and so on.

The face recognition system may recognize the face of the viewer in real time according to facial features or facial movement expressions. Generally, an adult has distinct facial features but few movement expressions, but a juvenile has indistinct facial features but many movement expressions.

The face recognition system may also use a machine learning algorithm to extract key features of juveniles and adults from a juvenile face library and an adult face library, and use the key features to determine whether a newly input human face image is an adult or a juvenile. The machine recognition algorithm includes a template matching method, a matrix singular-value characteristic method, a subspace analysis method, a principal component analysis method, and so on. Persons skilled in the art may find other recognition methods without making any creative efforts.

Optionally, before the face of the viewer is recognized, a viewer face information database may be created in the playback device, where the face information database stores face information of two types of viewers. For example, according to a viewer photo that is input beforehand, the face recognition system performs image collection, face positioning, and feature extraction for the photo, and finally creates a viewer face information database. The database may classify an age type of the viewer according to face information of the viewer. When recognizing the face of the viewer, the face recognition system may compare the viewer face with the face information in the database to determine the age type of the viewer. Understandably, if the database stores only face information of one type of viewer, when the recognized face information of a viewer does not match the face information in the database, it indicates that the viewer is the other type of viewer. For example, one type of viewer is adults, and the other type of viewer is juveniles. Then a machine recognition algorithm is used to extract the facial features according to the face information database.

At step 12: The playback device obtains information about a position and length of a sensitive clip in the multimedia file if the determined age type includes a juvenile type.

If the multimedia file is a video file or an audio file, the position and the length of the sensitive clip corresponds to a start frame sequence number and a frame length of the sensitive clip, respectively; and, if the multimedia file is a PowerPoint file being played, the position and the length of the sensitive clip corresponds to a sequence number of the start PowerPoint page of the sensitive clip and the number of PowerPoint pages of the sensitive clip, respectively.

That is, the playback device obtains the information about the position and length of the sensitive clip in the multimedia file if the determined age type is a juvenile type or is a juvenile type and an adult type. Generally, if the determined age type includes a juvenile type and an adult type, the playback device displays option information asking whether to play the sensitive clip, and the playback device obtains the information about the position and length of the sensitive clip in the multimedia file after receiving a response to the option information, where the response indicates not playing the sensitive clip.

Specifically, the playback device may obtain the information about the position and length of the sensitive clip in the multimedia file from an additional information file corresponding to the multimedia file, where the additional information file is used to store the information about the position and length of the sensitive clip in the multimedia file.

Generally, before the information about the position and length of the sensitive clip in the multimedia file is obtained, the playback device may determine the position and length of the sensitive clip in the multimedia file by detecting content of the multimedia file.

For example, the playback device receives and detects a multimedia file to be played, where the multimedia file may include a clip that is sensitive for the viewer. The sensitive clip includes a multimedia file that includes violence, terrorism, pornography or the like that is inappropriate for a specific type of user, and the sensitive clip may be all or part of the video. When the playback device detects that the multimedia file to be played includes a clip that is sensitive for the viewer, the playback device may determine what multimedia file will be played to the viewer according to the age type of the viewer. The content detection may be implemented by using movement detection of the machine recognition algorithm or a similar algorithm.

At step 13: The playback device plays the multimedia file in which the sensitive clip is hidden to the viewer of a juvenile type according to the information about the position and length of the sensitive clip in the multimedia file.

When the playback device recognizes that the age type of the viewer is an adult type, the playback device plays the multimedia file in which the sensitive clip is not hidden to the viewer.

When the playback device recognizes that the age type of the viewer is an adult type and a juvenile type, the playback device displays to the viewer option information asking whether to play the sensitive clip, and plays the multimedia file in which the sensitive clip is not hidden to the viewer if a selection made by the viewer in response to the option information indicates playing the sensitive clip.

That is, only an adult viewer is able to watch the sensitive clip, and a juvenile viewer is unable to choose to watch the sensitive clip.

Therefore, the embodiment of the present disclosure can prevent inappropriate videos, images, and other information from adversely affecting juveniles.

After the multimedia file playback method provided in the embodiment of the present disclosure is adopted, the adverse effect caused by the following social phenomena are avoided effectively: because a multimedia file that is played cannot be preprocessed, juveniles access unhealthy content such as pornography, blood and gore, and violence, which is extremely harmful to mental and physical health of juveniles.

For example, a parent may create a family face information database, where the face information database stores face information of adults (such as parents) and face information of juveniles (such as children). Then a machine recognition algorithm is used to extract facial features of a viewer according to the face information database.

After starting to play the multimedia file, the playback device recognizes the face of the viewer in real time, and compares the viewer face information with the face information in the database to determine the age type of the viewer. Meanwhile, the playback device receives and detects a multimedia file to be played to determine whether the multimedia file includes a clip that is sensitive for the viewer.

Especially, if the playback device determines that the age type of the viewer includes a juvenile type, that is, the playback device determines that the age type of the viewer is a juvenile type or is a juvenile type and an adult type, the playback device needs to obtain the information about the position and length of the sensitive clip in the multimedia file. For example, the playback device may obtain the information about the position and length of the sensitive clip in the multimedia file from an additional information file corresponding to the multimedia file, where the additional information file is used to store the information about the position and length of the sensitive clip in the multimedia file.

In general, at present, facial recognition technologies are primarily classified into a static recognition technology (also referred to as physiological feature recognition) and a dynamic recognition technology (also referred to as behavior feature recognition).

Static recognition is recognition by using facial features (such as face profile, facial size and layout, complexion and wrinkles, and so on). Generally, a juvenile has smaller facial size and lower extent of compactness than an adult and a more homogeneous complexion than an adult, and a juvenile has fewer wrinkles than an adult or has no wrinkles.

The static recognition technology includes a characteristic face recognition method, a neural network recognition method, and a resilient image matching method. Such methods are basically to extract and analyze geometric features of human faces to easily obtain geometric characteristic differences between a juvenile face and an adult face. The geometric characteristic differences are also combined with other features (such as complexion and wrinkles) of the human faces to further improve accuracy of face recognition.

The dynamic recognition technology is to recognize movement expressions on human faces. Generally, a juvenile has richer, more exaggerated and frequent expressions than an adult.

The dynamic recognition technology is based on the static recognition technology and is to recognize facial expression features of a person according to the change of geometric features of face wrinkles in the dynamic process of a human face. For example, the facial expressions of the person are recognized according to the change of the nasolabial folds of the human face, and the accuracy of face recognition is further improved according to the difference in facial expression features between a juvenile and an adult.

Specifically, when recognizing the face of the viewer, the playback device determines that the age type of the viewer is an adult type and/or a juvenile type. By default on the playback device, adults may be a type allowed to watch the sensitive clip and juveniles may be a type forbidden to watch the sensitive clip.

Therefore, the playback device plays the multimedia file in which the sensitive clip is not hidden to the viewer when the type of the viewer recognized by the playback device is an adult, and the playback device plays the multimedia file in which the sensitive clip is hidden to the viewer when the type of the viewer recognized by the playback device is a juvenile. When the type of the viewer recognized by the playback device is an adult and a juvenile, the playback device displays the viewer option information asking whether to play the sensitive clip.

If a juvenile chooses to continue to watch the sensitive clip, the playback device terminates the playback process. If the juvenile chooses to skip the sensitive clip, the playback device plays the multimedia file in which the sensitive clip is hidden. If an adult chooses to continue to watch the sensitive clip, the playback device plays the multimedia file in which the sensitive clip is not hidden.

That is, only an adult is able to choose to continue to watch the sensitive clip, and a juvenile is unable to choose to watch the sensitive clip. Therefore, when the parents are absent, it is not necessary to worry whether the children will watch unhealthy sensitive clips.

Therefore, the embodiment of the present disclosure can prevent inappropriate videos, images, and other information from adversely affecting juveniles and can take the rights and interests of adults into account.

In the above specific embodiments, a static content filtering technology is adopted. That is, a viewer face information database needs to be created, and the type of the viewer is determined by comparing the recognized viewer face information with the face information in the database, and thus the specific multimedia file to be played is determined.

In fact, the multimedia file playback method in the embodiment of the present disclosure may also adopt a dynamic content filtering technology, in which no viewer face information database needs to be created.

Figure 2:
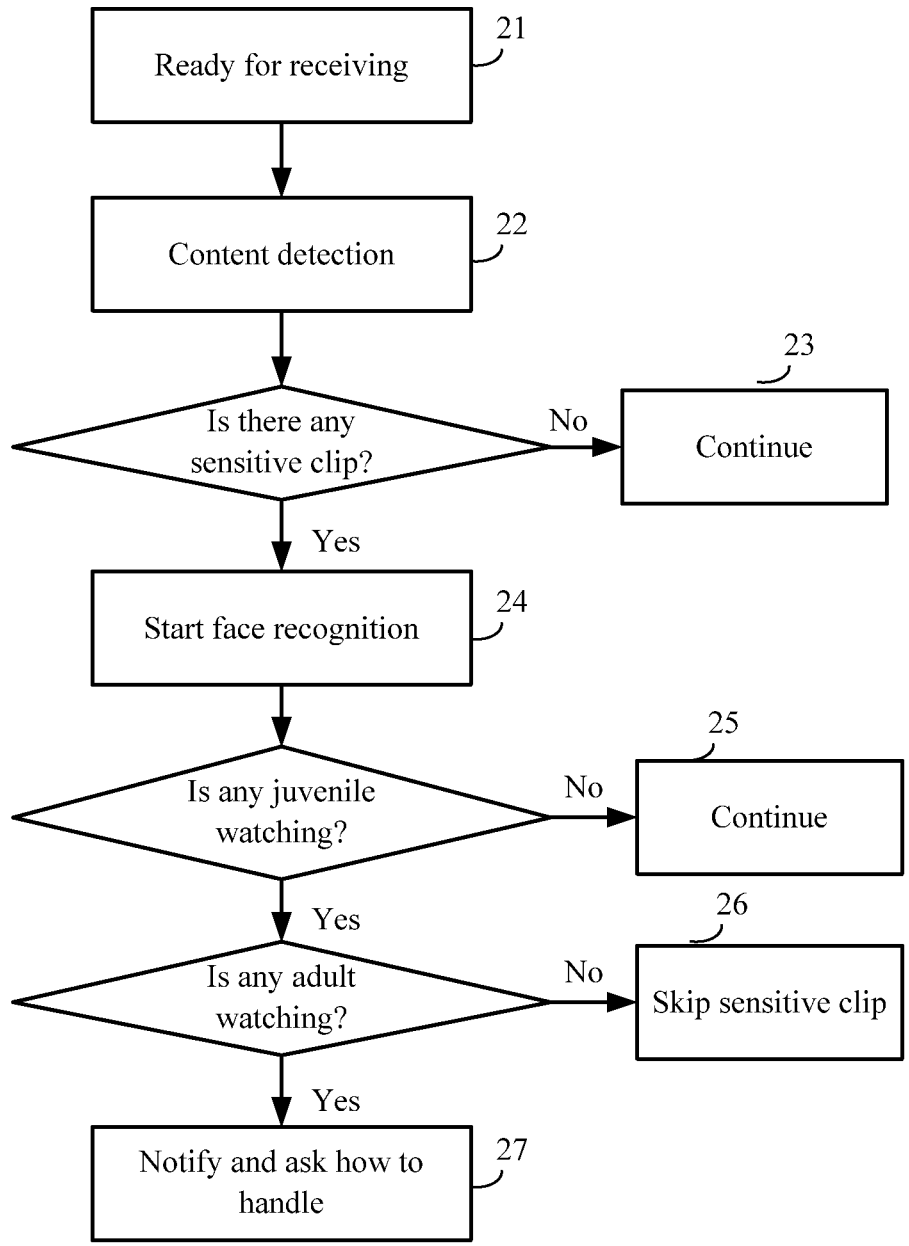
FIG. 2 is a flowchart of a multimedia file playback method according to a specific embodiment of the present disclosure.

In the specific embodiment shown in FIG. 2, at step 21: the playback device receives a multimedia file to be played and at step 22: the playback device detects whether the multimedia file includes a sensitive clip. At step 23: if no sensitive clip is detected, the playback device continues playing the multimedia file. If a sensitive clip is detected, the playback device determines whether to play the sensitive clip according to an age type of a viewer.

At step 24: the playback device recognizes the face of the viewer in real time to determine whether the age type of the viewer is an adult or a juvenile. For example, the face of the viewer may be recognized according to facial features or facial movement expressions to determine whether the age type of the viewer is an adult or a juvenile.

At step 25: the playback device plays the multimedia file in which the sensitive clip is not hidden to the viewer if the viewer recognized by the playback device is an adult.

If the viewers recognized by the playback device include a juvenile, the playback device needs to obtain information about a position and length of the sensitive clip in the multimedia file. The playback device may hide the sensitive clip in the multimedia file according to the information about the position and length of the sensitive clip. For example, at step 26: if the viewers recognized do not include an adult, it indicates that all viewers are juveniles, and the playback device plays the multimedia file in which the sensitive clip is hidden to the viewers. At step 27: if the viewers recognized by the playback device include both a juvenile and an adult, the playback device displays option information asking whether to play the sensitive clip and plays the multimedia file in which the sensitive clip is hidden to the viewers after a response to the option information is received, where the response indicates not playing the sensitive clip.

Generally, the playback device may obtain the information about the position and length of the sensitive clip in the multimedia file by using the following methods: method 1: determining the position and length of the sensitive clip in the multimedia file by detecting content of the multimedia file; method 2: obtaining the information about the position and length of the sensitive clip in the multimedia file from an additional information file corresponding to the multimedia file, where the additional information file is used to store the information about the position and length of the sensitive clip in the multimedia file.

Evidently, the multimedia file playback method in the embodiment of the present disclosure can prepare for the "sensitive clip" in the multimedia file or on the website beforehand (for example, affix a tag to or scan and detect the sensitive clip), and then, based on a human face recognition technology, give an alert on the "sensitive clip" beforehand, and an adult operation mode and a juvenile operation mode are provided. An adult may choose "Continue" or "Skip sensitive clip" or a similar option according to the requirements of the adult. A juvenile can choose only "Skip sensitive clip" or "Exit" or a similar option.

The embodiment of the present disclosure can perform Real-time monitoring and preprocessing for the multimedia file that is being played and inappropriate for a juvenile. After an adult detects a sensitive clip (because no juvenile is on the scene), the adult may choose "Continue"; and, when a juvenile appears suddenly, the sensitive clip being played can be processed automatically and immediately according to the recognized juvenile identity.

In this way, the multimedia file is played selectively based on the face recognition technology, which prevents inappropriate videos, images, and other information from adversely affecting juveniles.

The following uses two common scenarios to describe how to apply the method provided in the embodiment of the present disclosure. A multimedia file filtering technology supported by face recognition according to the embodiment of the present disclosure may be applied to a variety of visualization terminal devices, which are not limited to network devices and multimedia devices in the following embodiment.

Scenario 1: Searching for information on the Internet. When a user starts up a computer, the computer scans and verifies a human face within the scope of a probe and is in a standby state for prompting a "sensitive clip".

First, when the user opens a search engine (such as Google and Baidu) and enters a keyword of content to be searched for, a resource server scans and detects the read content in a memory, and determines whether a sensitive clip is included.

If the detected previewed content is appropriate for playback, the user is unaware of the reading and pre-detection process in the memory. If the detected previewed content includes a "sensitive clip", an alert is displayed, a face recognition system is started to scan and verify the human face at the same time, and operation rights are allocated according to the scanned and verified user identity. For example, when an adult responds to the alert, the adult is allowed to select "Continue" or "Skip sensitive clip"; and, when a juvenile responds to the alert, the juvenile is allowed only to select "Skip sensitive clip" or "Exit".

Scenario 2: Watching a multimedia file at home. When a user starts multimedia, the multimedia scans and verifies a human face within the scope of a video probe and is in a standby state for prompting a "sensitive clip".

First, a signal receiving system scans and detects the multimedia file to be played and determines whether a sensitive clip is included. In some countries or areas, the media playback regulation authority reviews the multimedia file to be played and marks the "sensitive clip".

If the previewed content detected by the signal receiving system is appropriate for playback, the user is unaware of the pre-detection process. If the previewed content detected by the signal receiving system includes a "sensitive clip", an alert is displayed, a face recognition system is also started to scan and verify the human face at the same time, and operation rights are allocated according to the scanned and verified user identity. For example, when an adult responds to the alert, the adult is allowed to select "Continue" or "Skip sensitive clip"; and, when a juvenile responds to the alert, the juvenile is allowed only to select "Skip sensitive clip" or "Exit".

Therefore, with the content inappropriate for juveniles being filtered out, the mental and physical health of juveniles is protected, and the worry of parents and the society for the mental and physical health of juveniles is reduced. Meanwhile, the rights and interests of adults and the interests of service providers are protected, that is, an adult can make flexible selections when surfing the Internet or watching a multimedia file and will not "give up the whole movie due to one picture". Further, the embarrassment that occurs when multiple users watch a multimedia file or search for information on the Internet at the same time is avoided, and user requirements are greatly fulfilled. The problem caused by irregular emergence of the sensitive clip and users is solved, and better user experience is ensured.

Figure 3:
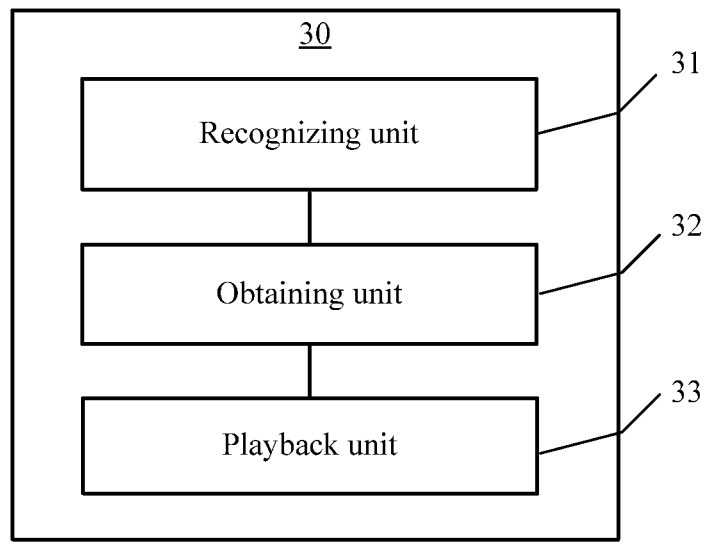
FIG. 3 is a schematic structural diagram of a multimedia file playback apparatus according to an embodiment of the present disclosure.
Figure 4:
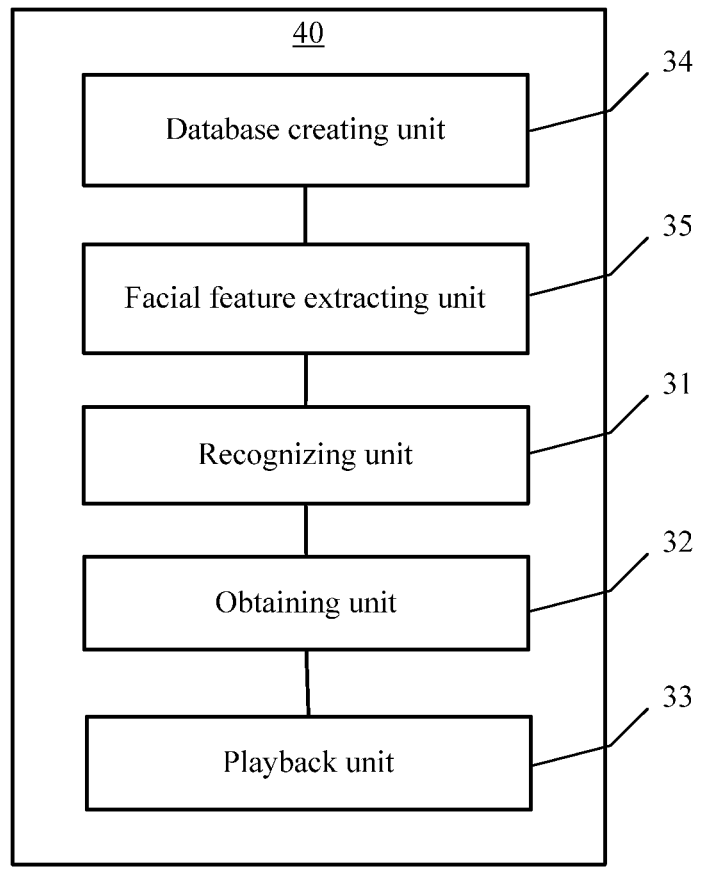
FIG. 4 is a schematic structural diagram of a multimedia file playback apparatus according to another embodiment of the present disclosure.

FIG. 3 and FIG. 4 are structural diagrams of a multimedia file playback apparatus according to an embodiment of the present disclosure.

As shown in FIG. 3, the multimedia file playback apparatus 30 includes a recognizing unit 31, an obtaining unit 32, and a playback unit 33.

The recognizing unit 31 may be configured to recognize a face of a viewer to determine an age type of the viewer, where the age type includes an adult type and a juvenile type. Specifically, the recognizing unit 31 may be configured to recognize the face of the viewer according to facial features or facial movement expressions to determine the age type of the viewer.

The obtaining unit 32 may be configured to obtain information about a position and length of the sensitive clip in the multimedia file if the age type determined by the recognizing unit 31 includes a juvenile type; or, the obtaining unit 32 may be configured to obtain the information about the position and length of the sensitive clip in the multimedia file if the age type determined by the recognizing unit 31 is a juvenile type or is a juvenile type and an adult type.

Specifically, if the age type determined by the recognizing unit 31 includes a juvenile type and an adult type, the playback unit 33 may display option information asking whether to play the sensitive clip and receive a response to the option information, where the response indicates not playing the sensitive clip. The obtaining unit 32 is configured to obtain the information about the position and length of the sensitive clip in the multimedia file after the playback unit 33 receives the response to the option information, where the response indicates not playing the sensitive clip. The playback unit 33 may be further configured to play the multimedia file in which the sensitive clip is hidden to the viewer according to the information about the position and length of the sensitive clip after the response to the option information is received, where the information about the position and length is obtained by the obtaining unit 32 and the response indicates not playing the sensitive clip.

Further, the obtaining unit 32 may be configured to determine the position and length of the sensitive clip in the multimedia file by detecting content of the multimedia file if the age type determined by the recognizing unit 31 is a juvenile type or is a juvenile type and an adult type; or, the obtaining unit 32 may be configured to: if the age type determined by the recognizing unit 31 is a juvenile type or is a juvenile type and an adult type, obtain the information about the position and length of the sensitive clip in the multimedia file from an additional information file corresponding to the multimedia file, where the additional information file is used to store the information about the position and length of the sensitive clip in the multimedia file.

The playback unit 33 may be configured to play the multimedia file in which the sensitive clip is hidden to the viewer according to the information about the position and length of the sensitive clip in the multimedia file, where the information is obtained by the obtaining unit 32.

Specifically, the playback unit 33 may play the multimedia file in which the sensitive clip is not hidden to the viewer if the age type of the viewer recognized by the recognizing unit 31 is an adult type; or, if the recognizing unit 31 recognizes that the age type of the viewer includes an adult type and a juvenile type, the playback unit 33 may display option information asking whether to play the sensitive clip, and the playback unit 33 may play the multimedia file in which the sensitive clip is not hidden to the viewer if a selection made by the viewer in response to the option information indicates playing the sensitive clip.

The multimedia file playback apparatus 40 shown in FIG. 4 further includes a database creating unit 34 and a facial feature extracting unit 35 in addition to the recognizing unit 31, the obtaining unit 32, and the playback unit 33. The database creating unit 34 may be configured to: before the recognizing unit 31 recognizes the face of the viewer according to facial features or facial movement expressions, create a viewer face information database, where the face information database stores face information of two types of viewers, that is, an adult type and a juvenile type; and the facial feature extracting unit 35 may be configured to use a machine recognition algorithm to extract the facial features according to the face information database created by the database creating unit 34.

Therefore, the embodiment of the present disclosure can prevent inappropriate videos, images, and other information from adversely affecting juveniles.

Figure 5:
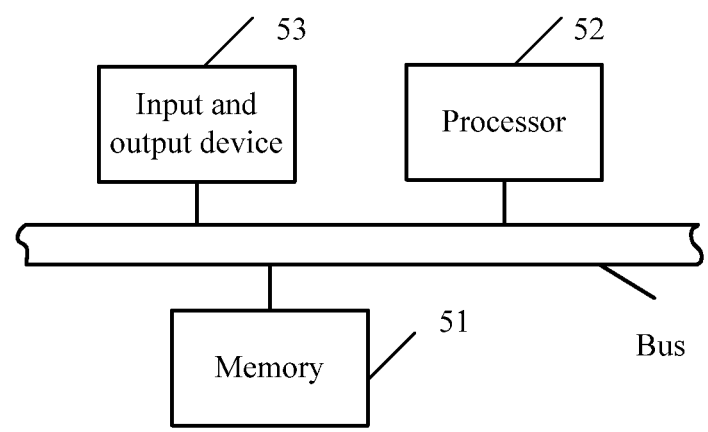
FIG. 5 is a schematic structural diagram of a playback device according to an embodiment of the present disclosure.

FIG. 5 shows a playback device according to an embodiment of the present disclosure. The playback device includes a memory 51, a processor 52, an input and output device 53, and a bus. The memory 51 and the input and output device 53, and the processor 52 are connected by using the bus, where the input and output device 53 includes a display, and the memory 51 includes data and code. The processor 52 is coupled with the memory 51 and calls and executes the code in the memory 51 to implement the following functions: recognizing a face of a viewer to determine an age type of the viewer, where the age type includes an adult type and a juvenile type; obtaining information about a position and length of a sensitive clip in a multimedia file if the determined age type includes a juvenile type (for example, the age type of the viewer is a juvenile type or is a juvenile type and an adult type); and then controlling the display to play the multimedia file in which the sensitive clip is hidden to the viewer according to the information about the position and length of the sensitive clip in the multimedia file, where the information about the position and length is determined by the processor 52.

Further, the processor 52 specifically implements the following functions: determining the position and length of the sensitive clip in the multimedia file by detecting content of the multimedia file; or obtaining the information about the position and length of the sensitive clip in the multimedia file from an additional information file corresponding to the multimedia file, where the additional information file is used to store the information about the position and length of the sensitive clip in the multimedia file.

Further, the processor 52 implements the following function: recognizing the face of the viewer according to facial features or facial movement expressions.

The input and output device 53 includes a camera, and, before the recognizing the face of the viewer, the method further includes: controlling the camera to obtain a face image of the viewer.

Further, the processor 52 implements the following functions: before the face of the viewer is recognized, creating a viewer face information database, where the face information database is stored in the memory 51, and the face information database stores face information of two types of viewers; and using a machine recognition algorithm to extract the facial features according to the face information database.

Further, the display may play the multimedia file in which the sensitive clip is not hidden to the viewer if the age type of the viewer determined by the processor 52 is an adult type. Optionally, if the processor 52 determines that the age type of the viewer includes an adult type and a juvenile type, the display may display option information asking whether to play the sensitive clip, and play the multimedia file in which the sensitive clip is not hidden to the viewer if a selection made by the viewer in response to the option information indicates playing the sensitive clip.

Therefore, the embodiment of the present disclosure can prevent inappropriate videos, images, and other information from adversely affecting juveniles.

Understandably, in the embodiment of the present disclosure, the term "and/or" is only an association relationship for describing associated objects and represents three possible relationships, for example, A and/or B may represent the following three cases: only A exists, both A and B exist, and only B exists. In addition, the character "/" herein generally means that the associated objects are in an "or" relationship.

Understandably, the solution described in each claim of the present disclosure should also be deemed an embodiment, and the features in the claims may be combined. For example, different tributary steps of execution after a judging step in the present disclosure may serve as different embodiments.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment according to actual needs.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present disclosure. The foregoing storage medium includes: any medium that can store program code, such as a universal serial bus (USB) flash drive, a removable hard disk, a read-only memory (Read-Only Memory, ROM), a random access memory (Random Access Memory, RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A multimedia file playback method implemented by an electronic device, comprising:
    recognizing a face of a viewer to determine an age type of the viewer and allocating operation right to the viewer according to the recognized age type, wherein the age type comprises an adult type and a juvenile type;
    obtaining information about a position and a length of a sensitive clip of the multimedia file when the determined age type comprises the juvenile type, wherein the multimedia file is a video file or an audio file, wherein the position and the length of the sensitive clip corresponds to a start frame sequence number and a frame length of the sensitive clip, wherein when the multimedia file is a POWERPOINT file being played, the position and the length of the sensitive clip corresponds to a sequence number of the start POWERPOINT page of the sensitive clip and the number of the POWERPOINT pages of the sensitive clip;
    playing the multimedia file in which the sensitive clip is hidden to the viewer according to the information about the position and length of the sensitive clip in the multimedia file when the age type of the viewer is the juvenile type;
    displaying option information asking whether to play the sensitive clip when the age type of the viewer comprises the adult type and the juvenile type, wherein the displayed option information is corresponding to the allocated operation right;
    playing the multimedia file in which the sensitive clip is not hidden to the viewer when a selection made by a viewer with the adult type in response to the option information indicates playing the sensitive clip; and
    playing the multimedia file in which the sensitive clip is hidden to the viewer according to the information about the position and length of the sensitive clip in the multimedia file when a selection made by a view with the adult type in response to the option information indicates not playing the sensitive clip.

2. The method according to claim 1, wherein obtaining information about the position and the length of the sensitive clip in the multimedia file when the determined age type comprises the juvenile type comprises obtaining the information about the position and the length of the sensitive clip in the multimedia file when the determined age type is either the juvenile type or the juvenile type and the adult type.

3. The method according to claim 2, wherein obtaining information about the position and the length of the sensitive clip in the multimedia file when the determined age type comprises the juvenile type and the adult type comprises:
    displaying option information asking whether to play the sensitive clip when the determined age type comprises the juvenile type and the adult type; and
    obtaining the information about the position and length of the sensitive clip in the multimedia file after a response to the option information is received, and
    wherein the response indicates not playing the sensitive clip.

4. The method according to claim 1, wherein obtaining information about the position and the length of the sensitive clip in the multimedia file comprises determining the position and the length of the sensitive clip in the multimedia file by detecting content of the multimedia file.

5. The method according to claim 1, wherein obtaining information about the position and the length of the sensitive clip in the multimedia file comprises obtaining the information about the position and the length of the sensitive clip in the multimedia file from an additional information file corresponding to the multimedia file, wherein the additional information file is used to store the information about the position and length of the sensitive clip in the multimedia file.

6. The method according to claim 1, wherein after recognizing the face of the viewer to determine the age type of the viewer, the method further comprises playing the multimedia file in which the sensitive clip is not hidden to the viewer when the age type of the viewer is the adult type.

7. The method according to claim 1, wherein recognizing the face of the viewer to determine the age type of the viewer comprises recognizing the face of the viewer according to facial features or facial movement expressions to determine the age type of the viewer.

8. The method according to claim 7, wherein before recognizing the face of the viewer according to facial features or facial movement expressions, the method further comprises:
creating a viewer face information database, wherein the face information database stores face information of two types of viewers, wherein one of type Of viewer is the adult type and the other type of viewer is juvenile type; and
using a machine recognition algorithm to extract the facial features according to the face information database.

9. A multimedia file playback apparatus, comprising:
a computer processor configured to:
recognize a face of a viewer to determine an age type of the viewer and allocate operation right to the viewer according to the recognized age type, wherein the age type comprises an adult type and a juvenile type;
obtain information about a position and a length of a sensitive clip in a multimedia file when the age type comprises the juvenile type, wherein the multimedia file is a video file or an audio file, wherein the position and the length of the sensitive clip corresponds to a start frame sequence number and a frame length of the sensitive clip, wherein when the multimedia file is a POWERPOINT file being played, the position and the length of the sensitive clip correspond to a sequence number of a start POWERPOINT page of the sensitive clip and a number of POWERPOINT pages of the sensitive clip;
play the multimedia file in which the sensitive clip is hidden to the viewer according to the information about the position and length of the sensitive clip in the multimedia file when the age type of the viewer is the juvenile type;
display option information asking whether to play the sensitive clip when the age type of the viewer comprises the adult type and the juvenile type, wherein the displayed option information is corresponding to the allocated operation right;
play the multimedia file in which the sensitive clip is not hidden to the viewer when a selection made by a viewer with the adult type in response to the option information indicates playing the sensitive clip; and
play the multimedia file in which the sensitive clip is hidden to the viewer according to the information about the position and length of the sensitive clip in the multimedia file when a selection made by a viewer with the adult type in response to the option information indicates not plying the sensitive clip.

10. The apparatus according to claim 9, wherein the computer processor is further configured to obtain the information about the position and the length of the sensitive clip in the multimedia file when the age type is either the juvenile type or the juvenile type and the adult type.

11. The apparatus according to claim 10, wherein when the section made by the viewer with the adult type in response to the option information indicates not playing the sensitive clip, the computer processor is further configured to:
obtain information about the position and the length of the sensitive clip in the multimedia file after the playback unit receives the response to the option information; and
play the multimedia file in which the sensitive clip is hidden to the viewer according to the information about the position and length of the sensitive clip after receiving the response to the option information.

12. The apparatus according to claim 10, wherein the computer processor is further configured to determine the position and the length of the sensitive clip in the multimedia file by detecting content of the multimedia file when the age type is the juvenile type or is the juvenile type and the adult type.

13. The apparatus according to claim 10, wherein the computer processor is further configured to obtain the information about the position and the length of the sensitive clip in the multimedia file from an additional information file corresponding to the multimedia file when the age type is the juvenile type or is the juvenile type and the adult type, and wherein the additional information file is used to store the information about the position and the length of the sensitive clip in the multimedia file.

14. The apparatus according to claim 9, wherein the computer processor is further configured to play the multimedia file in which the sensitive clip is not hidden to the viewer when the age type of the viewer recognized by the recognizing unit is the adult type.

15. The apparatus according to claim 9, wherein the computer processor is further configured to recognize the face of the viewer according to facial features or facial movement expressions to determine the age type of the viewer.

16. The apparatus according to claim 15, wherein the computer is further configured to:
create a viewer face information database before recognizing the face of the viewer according to facial features or facial movement expression, wherein the face information database stores face information of two types of viewers, wherein one of type of viewer is the adult type and the other type of viewer is juvenile type; and
use a machine recognition algorithm to extract the facial features according to the face information database.

* * * * *